United States Patent [19]

Galloway et al.

[11] Patent Number: 4,976,047
[45] Date of Patent: Dec. 11, 1990

[54] APPARATUS AND METHOD FOR MEASURING THE LENGTH OF ELASTOMERIC ARTICLES

[75] Inventors: F. Merrill Galloway; Donald W. Campbell; Tommie H. Runion, all of Bellefontaine, Ohio

[73] Assignee: H.B.D. Industries, Inc., Bellefontaine, Ohio

[21] Appl. No.: 397,013

[22] Filed: Aug. 22, 1989

[51] Int. Cl.$^5$ .............................. G01B 3/12; G01B 5/04
[52] U.S. Cl. ..................................... 33/735; 33/501.02
[58] Field of Search ............... 33/501.02, 501.03, 732, 33/734–754, 778

[56] References Cited

U.S. PATENT DOCUMENTS

| | | | |
|---|---|---|---|
| 1,038,797 | 9/1912 | Sommerfield et al. | 33/753 |
| 1,626,265 | 4/1927 | Bryant | 33/747 |
| 1,652,407 | 12/1927 | Johnson | 33/746 |
| 1,739,247 | 12/1929 | Marchev | 33/743 |
| 2,081,102 | 5/1937 | Blue | 33/748 |
| 2,494,732 | 1/1950 | Weber | 33/753 |
| 3,068,579 | 12/1962 | Newman | 33/736 |
| 4,117,600 | 10/1978 | Guignard et al. | 33/735 |

OTHER PUBLICATIONS

Reel-O-Matic Systems, Inc., Product Catalog in its entirety and particularly, p. 33, Wrightsville, Pa. 17368.

Primary Examiner—Harry N. Haroian
Attorney, Agent, or Firm—Jeffrey S. Standley

[57] ABSTRACT

A measuring apparatus and method for measuring the length of elongated elastomeric articles, such as rubber hose, which has a slide table and one or two measuring wheels which contact the hose as it passes over the slide table. The wheels are connected to readout devices which visually display the measured length. The invention also comprises means for keeping the hose straight and means for controlling an arc effect in the hose as it is being measured. A method is described which explains a way to correct for stretch or shrinkage of the hose which tends to give false measurements. A method is offered on how to calibrate the apparatus.

3 Claims, 3 Drawing Sheets

APPARATUS AND METHOD FOR MEASURING THE LENGTH OF ELASTOMERIC ARTICLES

TECHNICAL FIELD

The present invention generally relates to a measuring apparatus for elastomeric articles and, more particularly, is concerned with a machine and method for measuring the length of elongated elastomeric articles such as rubber hose.

DISCUSSION

Elongated elastomeric articles, such as rubber hose, are usually sold in length units to suit a particular need. Today's annual market for rubber hose of the type usually made in long lengths is about 300,000,000 meters (one billion feet). In the past a measuring tolerance for length of plus or minus one percent for this type of hose was generally considered acceptable. However, in today's market place, in most instances, nothing under the specified length is acceptable. To meet this requirement, it has been necessary to allow additional length of hose over and above what was ordered.

Extra length of hose has usually been shipped just to be on the safe side. This has been due to the fact that the measuring machines in use today, to measure the length of rubber hose are not very accurate. This lack of accuracy has caused manufacturers to ship more feet of hose than they may be getting paid for. With even a small degree of error a manufacturer could be losing many thousands of dollars over the course of a year.

The measuring machines in use today are not well suited for a manufacturing process. They are usually placed near the end of a manufacturing process just before the hose is cut. The measuring machines usually do not propel the hose in any way. The hose may be conveyed to the measuring machine, and additionally the hose may be pulled through the measuring machine by a moving rubber belt mounted on a cutting machine and/or by the winding action of the reels on which the hose is packaged. Under normal operating conditions the hose may be moving through the measuring machine at speeds from 50 feet per minute to over 400 feet per minute. The measuring machines used today are not well suited for the wide range of speed and motion of the hose as it approaches and passes through the measuring machine. Many of the known measuring machines have a floating measuring wheel designed to handle the differing motions of the hose as it passes through the machine. However, a floating measuring wheel is responsible for a certain degree of error. As the hose approaches the measuring machine it may be moving both horizontally and vertically. A floating measuring wheel simply follows the path of the hose and does not prevent the hose from moving up and down or side to side. Also a floating measuring wheel does not prevent the hose from arcing over the wheel. All of these factors contribute to error in the measured readout.

There are three main sources of error in measuring the length of hose. These are: tension in the hose, stretching the hose beyond its relaxed length; the hose being hot which naturally makes the hose expand; and, an arc in the hose as it makes contact with the measuring wheel. Experimental and theoretical study of arc effect has demonstrated that arc effect can be a very serious source of error. The effects of heat and tension in the hose are more easily managed than arc effect. By allowing the hose to cool before it reaches the measuring wheel errors due to heat expansion can be nearly eliminated. Tension in the nose is usually caused by equipment which is used to pull the hose through the various stages of the manufacturing process. Overcoming the effects of tension in the hose can be accomplished with a method of the present invention.

Even under ideal conditions the accurate linear measuring of rubber hose is very difficult due to the nature of the hose itself. To attain a measurement accuracy of less than one-half of 1 percent error the hose arc of contact with the measuring wheel must be controlled. Theoretically and from experience it is known that when a rubber hose passes across a measuring wheel the most accurate measurement will be obtained when the hose is straight and forming a perfect tangent of contact with the measuring wheel. In a situation where the hose is in a concave arc surface of contact with the measuring wheel the surface of the hose contacting the wheel is in compression and the measurement will understate the actual length. In a situation where the hose is in a convex arc of contact with the measuring wheel the surface of the hose being measured is in extension and the measurement will overstate the actual length. The axis of rotation is the centerline of the nose and the centerline will travel the same distance (or speed) as the surface of the measuring wheel only when there is no arc at all. Averaging the speed of the surface of the hose in contact with the measuring wheel and the opposite surface of the hose not in contact with the measuring wheel will equal the speed of the hose centerline which is the correct speed. Theoretically, a measuring wheel contacting the top surface of the hose and a second measuring wheel contacting the bottom surface of the hose will give a correct average speed (length) regardless of the arc effect.

The arc effect has been found to be a significant factor in linear measurement error up to an arc of at least twelve feet in radius. The error of arc effect in small diameter nose is considerably less than in larger diameter hose because in small hose the difference in the radius of the hole surface against the measuring wheel and the radius at the centerline of the hose is relatively small. By the same token the arc effect with large diameter hose becomes very important because there is a significant difference in these radii. Measurement errors brought about by the arc effect are inversely proportional to an increase in radius of the arc. For example, if the radius of the arc described by the inside surface of the hose is doubled the error due to arc effect is cut in half.

Consequently, a need exists to improve the accuracy of measuring the length of elongated elastomeric articles such as rubber hose. A machine is needed that will be able to withstand the rigors of a hose manufacturing process; that will be able to control arc effect in the hose as it is being measured; that will be able to compensate for tension or shrinkage in the hose; that will be able to operate at typical production speeds; and finally a machine that will generally bring the hose under control and in a straight line as it is being measured.

SUMMARY OF THE INVENTION

The present invention provides a measuring apparatus and method designed to satisfy one or more of the aforementioned objectives. In accordance with the teachings of this invention, a measuring device is provided which has a slide table with a measuring wheel and measurement readout device. The apparatus has means for keeping an elastomeric article, such as rubber hose, straight while it is being measured and has means for controlling arc effect in the hose.

DESCRIPTION OF THE PREFERRED EMBODIMENTS

The greatest source of error in length measurement of hose has been proven to be the arc effect. Current measuring machines in use today are not designed to assure that the hose travels across the measuring wheel in a flat, straight line. Errors in excess of one percent due to arc effect are commonplace. Methods of calibrating the present day machines cannot compensate for the error due to arc effect.

Other sources of error do exist. There is a pronounced zig-zag effect as the hose is taken from a conveyer through the measuring apparatus. This is also a factor to be eliminated. Tension or shrinkage in the hose can lead to a false measurement. Although tension in the hose cannot easily be done away with during a manufacturing process, the present invention offers a method to compensate for tension. Therefore, the present invention offers an apparatus for controlling arc effect, zig-zag motion of the hose, and tension or shrinkage in the hose.

Figure 1:
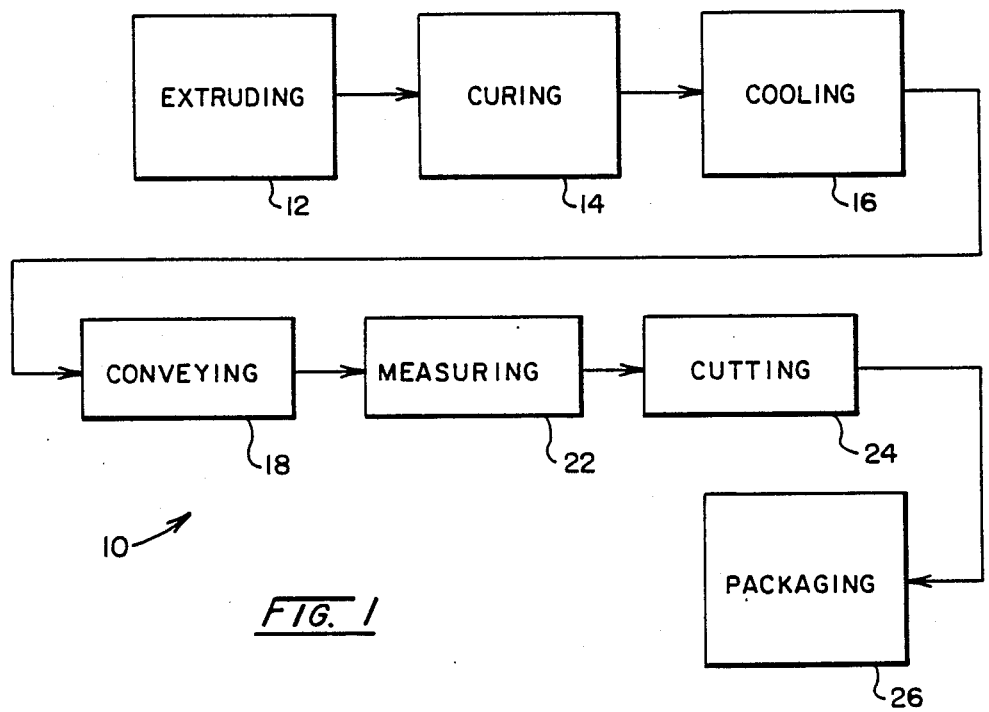
FIG. 1 is a flow chart of a typical rubber hose manufacturing process.

Referring now to the drawings, and more particularly FIG. 1, there is shown some probable steps in the manufacturing process 10 of rubber hose 20. The hose 20 may be first extruded 12 then cured 14 and finally cooled 16 in a bath. The steps involve many complex sub-steps which are not necessary to mention for the present invention. Suffice it to say that the hose 20 may be conveyed towards the measuring apparatus 22 and at the same time the cutting machine 24 or the packaging reels 20 may be pulling the hose 20 through the measuring apparatus 20. Thus, the measuring apparatus 22 may not be actually transporting the hose 20 in any way. The measuring apparatus 22 may be merely supporting the weight of the hose 20 as it passes through. After the hose 20 is cut in its desired length it may be packaged 26 on reels or in boxes to be shipped to the purchaser. Throughout this process the hose 20 may reach speeds of 50 to 400 feet per minute.

Figure 3:
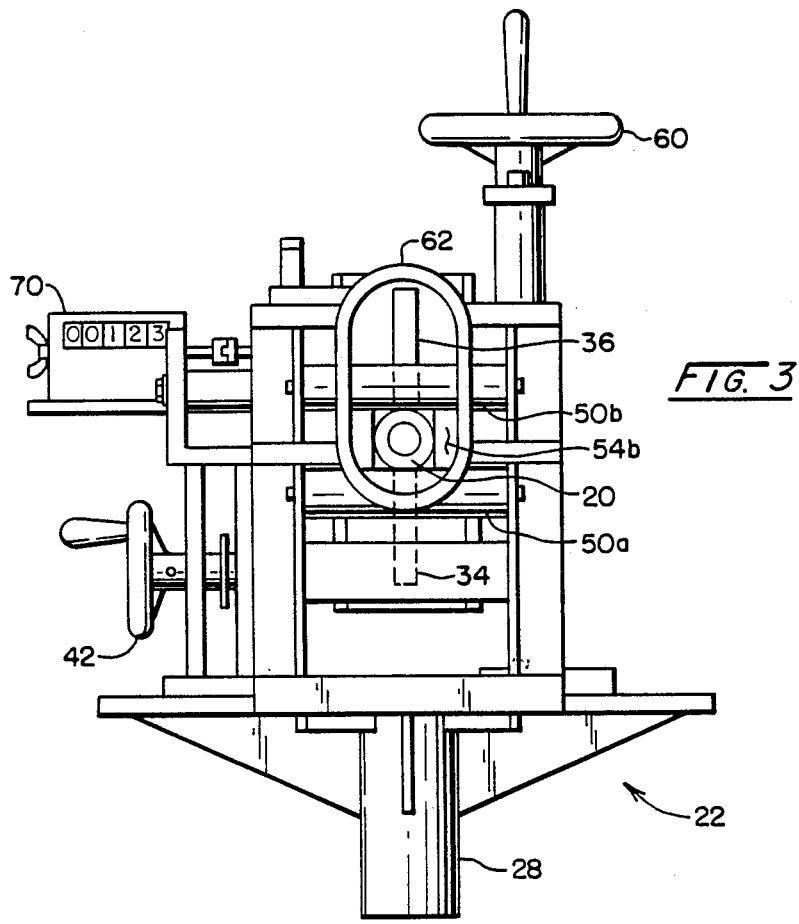
FIG. 3 is an end view of the entrance to the measuring apparatus.
Figure 2:
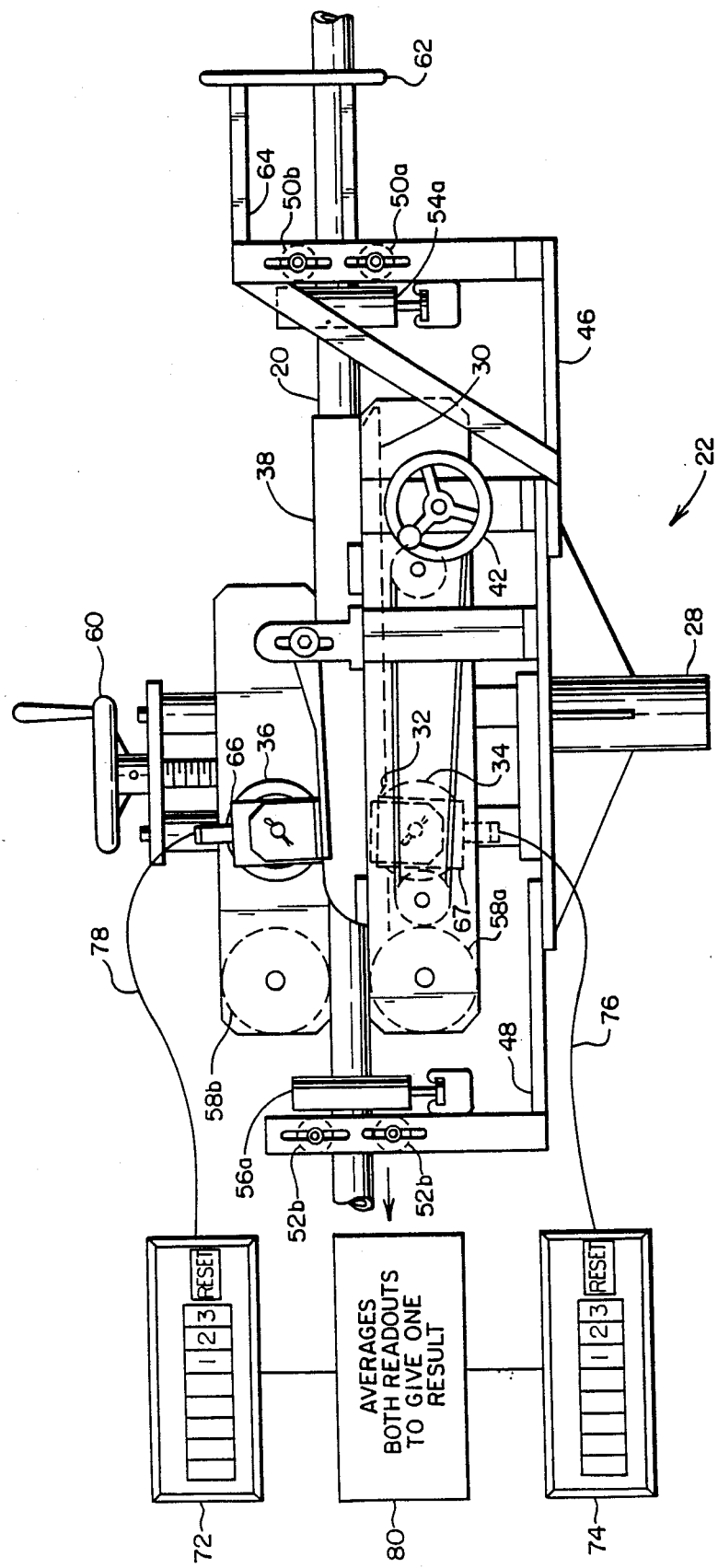
FIG. 2 is a side view of the measuring apparatus.
Figure 4:
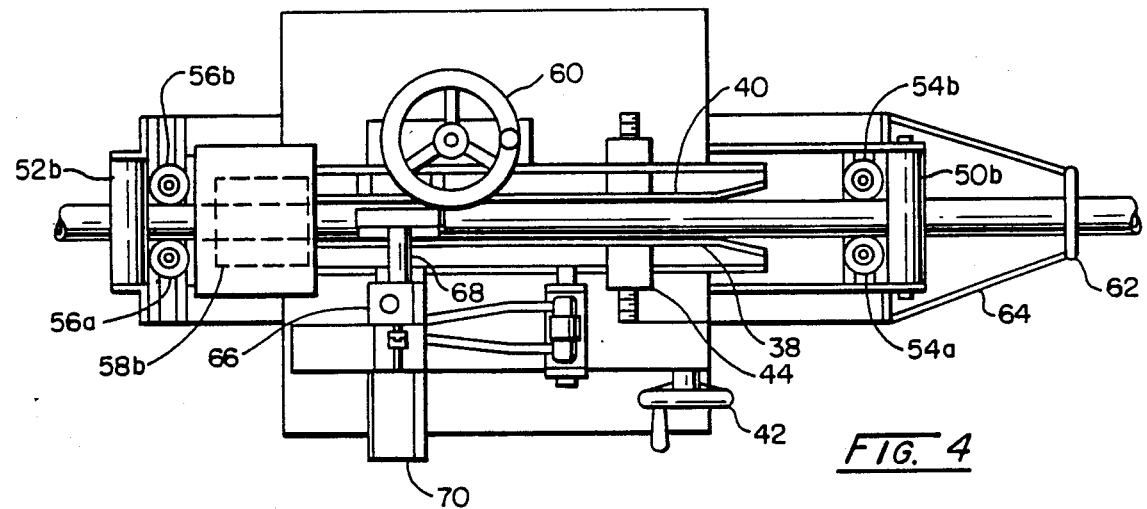
FIG. 4 is a plan view looking down on the measuring apparatus.

FIGS. 2 through 4 show various views of the preferred embodiment of the present invention. Mounted on a pedestal 28 is a slide table 30 for supporting the hose 20 as it moves through the measuring apparatus 22. The slide table 30 may be made of a ½" thick by 4" wide piece of nylon which provides a smooth motionless surface for the hose 20 to slide across. The slide table 30 might also be made of other plastics or metal. The slide table 30 is provided with a notched out section 32 where a measuring wheel 34 mounted below the slide table 30 may contact the hose 20 as it passes across the slide table 30. A second measuring wheel 36 is mounted above the slide table 30 so that it contacts the upper surface of the hose 20 as it crosses the slide table 30. The measuring wheels 34, 36 are assembled so that they may accommodate most any size hose 20 generally known and classed as long length hose. The second measuring wheel 36 may be mounted so that it freely rests upon the upper surface of the hose 20. The second measuring wheel would then be free to move up or down during operation as a floating wheel. The first measuring wheel 34 may be vertically adjustable to be locked in place during operation. In this embodiment it 34 would not float freely. A typical position for the first measuring wheel 34 is where the top tangent line of the wheel 34 is perfectly even with the top surface of the slide table 30 as shown in FIG. 2. The slide table 30 helps to enable the hose 30 to pass through the measuring wheels 34, 36 in an accurate and tangental relationship.

Positioned just slightly above the slide table 30 are two upright side fences 38,40. The side fences 38, 40 are connected to a side fence adjusting wheel 42 by means of a member 44 which allows the side fences 38, 40 to be adjustable horizontally to fit most any size hose 20 generally known and classed as long length hose. The side fence adjusting wheel 42 preferably allows the side fences 38, 40 to be adjusted over a continuous range up to about four inches apart. The side fences prevent the side to side or zig-zag motion common in current machines.

Extending by a frame 46 means to before the entrance of the measuring apparatus 22 and extending by frame 48 means to after the exit of the measuring apparatus 22 are two pairs of horizontal guide rollers 50a, 50b, 52a, 52b and two pairs of vertical guide rollers 54a, 54b, 56a, 56b at the entrance and exit of the apparatus 22. All guide rollers 50a–56b are preferably shaped as cylinders of approximately one inch diameter. The guide rollers 50a50b may be made of nylon or teflon. The two horizontal guide rollers 50a, 50b mounted at the entrance and the two horizontal guide rollers 52a, 52b mounted at the exit may all be adjustable independently in a vertical plane. The two vertical rollers 54a', 54b at the entrance and the two vertical rollers at the exit may also be adjustable independently in a horizontal plane. When processing a given size hose 20 the eight guide rollers 50a–56b can be positioned so that the hose 20 may move freely through the guide rollers 50a–56b. However, the guide rollers 50a–56b will prevent any movement of the hose 20 out of its true, longitudinal, tangental, path.

Preferably mounted after the measuring wheels 34, 36 but before the guide rollers 52, 56 at the exit of the apparatus 22 are two pinch rollers 58a, 58b. One pinch roller 58b is mounted so that it contacts the upper surface of the hose 20 as it passes through the apparatus 22. The second pinch roller 58a is mounted so that it contacts the bottom surface of the hose 20 as it crosses the slide table 30. The pinch rollers 58a, 58b are controlled by a pinch roller adjusting wheel 60 which enables the pinch rollers 58a, 58b to be adjusted in a vertical plane by turning the wheel 60. This way the pinch rollers 58a, 58b can function with most any size hose 20. The function of the pinch rollers 58a, 58b is to prevent any up and down motion of the hose 20 as it passes through the measuring wheels 34, 36. The pinch rollers 58a, 58b may be made of a neoprene rubber.

An extended detangler 62 is mounted by a frame 64 to the very front of the measuring apparatus 22, placed even before the guide rollers 50, 54 at the entrance to the measuring apparatus 22. The detangler 62 has been found to work best when made of a steel rod formed as an oval approximately 6 inches high by 4 inches wide. As the hose 20 is conveyed on the flaker belt 18 toward the measuring apparatus 22 it was discovered that the hose 20 tended to get tangled up from time to time as it entered the measuring apparatus 22. The detangler 62 untangles the hose 20 and generally stabilizes its motion before it reaches the guide rollers 50, 54. With the detangler 62 installed there have been no problems with the hose 20 traveling through the apparatus 22 at normal operating speeds.

Attached to the measuring wheel 34, 36 are shaft encoders 68,67 which translate the rotation of the measuring wheel 36 into a linear measurement. The shaft encoder 66 may be mounted directly to the same shaft 68 of the measuring wheel 36. That shaft 68 continues past the shaft encoder 66 out to a mechanical counter 70. The mechanical counters 70 (one not shown) are there as a safeguard in case the electrical counters 72, 74 would fail and are useful for accumulating the total footage for shift or lot so that the encoders may be set back to zero after each production unit (i.e. each reel). The shaft encoders 66, 67 of the preferred embodiment are connected by wire 76, 78 to remote readout totalizers 72, 74 which display the measured length of hose 20 in a digital display. For the present invention the measuring wheels 34, 38 may be provided by the Eaton Corporation of Watertown, Wis. The Durant Division of Eaton provides a measuring wheel, Model No. 20144-303, which was used in the preferred embodiment of the present invention. The shaft encoders used were also made by Durant, Model No. 39702-100. The mechanical counters 70 were also made by Durant, Model No. 5-H71-L-CL. Two different totalizers may be used. Durant makes a totalizer 72, 74 Model No. 5881-Q400, which may be used, one at each measuring wheel 34, 36, to provide independent measurements at both wheels 34, 36. If an average readout is preferred then Durant totalizer 80 Model No. 54420-400 may be used to provide one averaged readout based on the measurements from both measuring wheels 34, 36. Of course, other manufacturers' equipment could be used for the same result.

Figure 5:
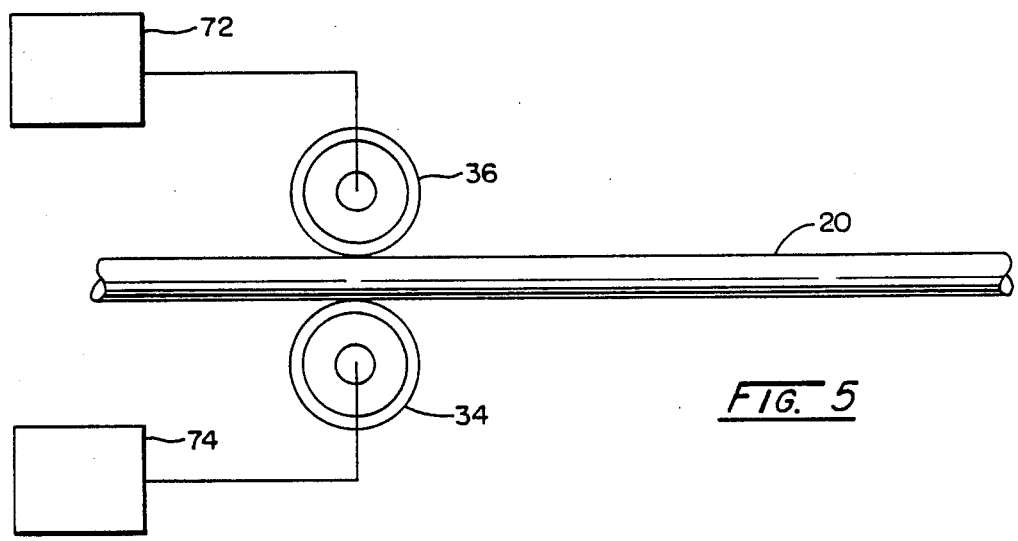
FIG. 5 is a view showing the hose making contact with two measuring wheels in a flat, straight, tangental manner.
Figure 6:
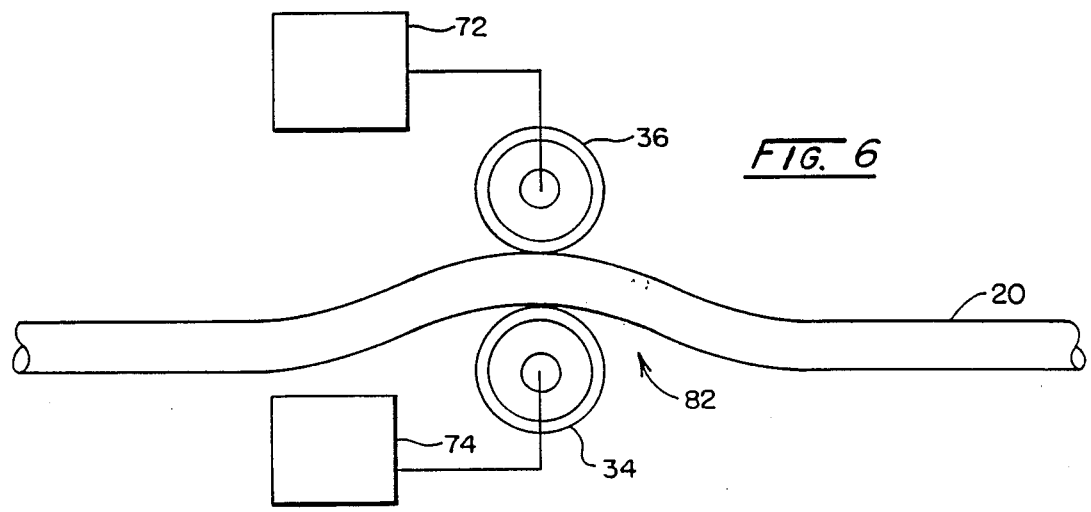
FIG. 6 is a view showing an arc in the hose as it makes contact with two measuring wheels.

Tension in the hose 20 induced by the various equipment pulling the hose 20 through the stages of the manufacturing process 10, must be considered to obtain a more accurate measurement. It has been found that the degree of stretch due to tension in the hose 20 is rather constant at particular points in the manufacturing process 10. By experimentation the actual amount of stretch per foot can be computed which will tend to remain constant. One way of eliminating the effects of tension on the measurement of hose length is to fool the measuring apparatus 22 by making adjustments to account for the amount of stretch per foot in the hose 20. This can be accomplished by actually inducing a small arc 82 in the hose 20 as it passes over the measuring wheels 34, 36. FIG. 6 best demonstrates the induced arc 82. By raising the measuring wheel 34, 38 the bottom wheel 34 will then give a reading which is less than the actual length of the hose 20 due to the arc effect. Once the stretch constant is computed it would be possible to compute the necessary amount of arc 82 in the hose 20 to offset the amount of stretch. The lower measuring wheel 34 would then be providing a more accurate measurement for the length of hose 20 in its final relaxed state. The tension induced in the hose 20 during the manufacturing process 10 may be slight. It is conceivable that the effects due to stretch may be small enough that the error in the final measurement would not be a concern. If tension in the hose 20 is negligible then the preferred arrangement of the measuring wheels 34, 36 with respect to the hose 20 is a flat, straight, tangental line as shown in FIG. 5.

It is thought that the measuring apparatus 22 and the method of the present invention and many of its attendant advantages will be understood from the foregoing description and it will be apparent that various changes may be made in the form and construction of the parts thereof without departing from the spirit and scope of the invention or sacrificing all of its material advantages, the form hereinbefore described being merely a preferred or exemplary embodiment thereof.

What is claimed is:

1. An apparatus for measuring the length of an elongated elastomeric article such as rubber hose or the like, comprising:
    a slide table;
    side fences mounted over the slide table for the elastomeric article to pass between, the side fences are simultaneously adjustable in a horizontal manner over a continuous range;
    a first measuring wheel contacting a surface of the elastomeric article as it moves across the slide table;
    a readout device connected to the first measuring wheel for indicating the length of the elastomeric article; and
    means for controlling the degree of arc of the elastomeric article as it moves across the measuring wheel.

2. An apparatus for measuring the length of an elongated elastomeric article such as rubber hose or the like, comprising:
    a slide table;
    a first measuring wheel contacting a surface of the elastomeric article as it moves across the slide table, the first measuring wheel is vertically adjustable to induce a predetermined arc in the elastomeric article to compensate for stretch and shrinkage in the elastomeric article;
    a second measuring wheel, installed so that it contacts an opposite surface, from the first measuring wheel, of the elastomeric article, the second measuring wheel is free to move up or down depending on the setting of the first measuring wheel;
    a readout device connected to the first measuring wheel for indicating the length of the elastomeric article; means for keeping the elastomeric article straight as it moves across the measuring wheel; and
    means for controlling the degree of arc of the elastomeric article as it moves across the measuring wheel.

3. An for measuring the length of an elongated elastomeric article, such as rubber hose or the like as the elastomeric article is conveyed through a manufacturing process, comprising:
    a slide table for supporting the elastomeric article as it moves through the measuring apparatus;
    a first measuring wheel mounted below the slide table to contact the bottom surface of the elastomeric article as it is converged across the slide table;

a second measuring wheel mounted above the slide table to contact the top surface of the elastomeric article as it is conveyed across the slide table;

three remote readout units, one readout unit connected to each measuring wheel, and the third unit displaying the average of the other two units, continually displaying the measured length of the elastomeric article as the elastomeric article is conveyed across the measuring wheels;

a mechanical counter connected to each of the measuring wheels to provide a backup measurement in case the remote readout units fail;

parallel side fences mounted over the slide table and simultaneously adjustable, horizontally, over a continuous range, for the elastomeric article to pass between;

adjustable pairs of horizontal and vertical guide rollers mounted at an entrance and exit of the measuring apparatus;

two pinch rollers mounted near the measuring wheels such that one pinch roller contacts the top surface of the elastomeric article and another pinch roller contacts the bottom surface of the elastomeric article and the top pinch roller being adjustable vertically to suit any particular size of elastomeric article; and an extended detangler mounted in front of the entrance to the measuring apparatus to generally straighten and untangle the elastomeric article before it reaches the horizontal and vertical rollers at the entrance of the measuring apparatus.

* * * * *